United States Patent [19]

Eng

[11] Patent Number: 4,524,412

[45] Date of Patent: Jun. 18, 1985

[54] PEAK CURRENT CONTROLLED CONVERTER WITH ADDITIONAL CURRENT THRESHOLD CONTROL LEVEL TO LIMIT CURRENT TAILOUT DURING OVERLOAD CONDITIONS

[75] Inventor: Wing K. Eng, Stanhope, N.J.

[73] Assignee: AT&T Bell Laboratories, Murray Hill, N.J.

[21] Appl. No.: 501,501

[22] Filed: Jun. 6, 1983

[51] Int. Cl.³ ............................................. H02H 7/122
[52] U.S. Cl. ....................................... 363/56; 363/20; 363/26; 363/79; 323/285
[58] Field of Search ....................... 363/20, 24, 26, 56, 363/78, 79; 323/285, 286, 287

[56] References Cited

U.S. PATENT DOCUMENTS

| | | | |
|---|---|---|---|
| 4,058,758 | 11/1977 | Peterson | 363/56 |
| 4,209,826 | 6/1980 | Priegnitz | 323/285 |
| 4,357,572 | 11/1982 | Andersen et al. | 323/286 |

Primary Examiner—Peter S. Wong
Assistant Examiner—Anita M. Ault
Attorney, Agent, or Firm—Alfred G. Steinmetz

[57] ABSTRACT

A power converter circuit, which is voltage-regulated and current-limited by a peak current control circuit, significantly reduces the current tailout effect by decreasing the frequency of operation of the converter during low voltage output current-limited operation by increasing the nonconduction interval of the power switch while maintaining a fixed conduction interval.

The peak current control circuit periodically initiates current conduction in the power switch in response to a clock pulse, and terminates conduction when a peak current level is attained. The peak current control includes circuitry to compare decaying current in the filter circuit during nonconducting intervals with a preset current tailout threshold level. The periodic triggering of the power switch into conduction is inhibited until current has decayed to this current tailout threshold level.

6 Claims, 8 Drawing Figures

PEAK CURRENT CONTROLLED CONVERTER WITH ADDITIONAL CURRENT THRESHOLD CONTROL LEVEL TO LIMIT CURRENT TAILOUT DURING OVERLOAD CONDITIONS

TECHNICAL FIELD

This invention relates to current limit circuits and, in particular, to current limit circuits utilized in DC-to-DC converters with peak current control features to eliminate current tailout during low voltage overload conditions.

BACKGROUND OF THE INVENTION

Peak current control is a regulation technique applied to switching regulators or converter circuits to periodically respond to a peak current value in the power switch to terminate the current conduction interval in that switch. Current level in a power switch of a switching regulator increases linearly after a clock pulse initiates the switch's conducting interval. This increasing current value is continuously compared with a reference current level and the switch is turned off when this reference level is attained. This reference level value may be variable in response to an error voltage dependent on the regulators output voltage to achieve voltage regulation or it may be a current related value to achieve current regulation. A detailed discussion of peak current control entitled "Simple Switching Control Method Changes Power Converter Into A Current Source" by C. Deisch and published in the record of the *Power Electronics Specialists Conference*, 1978, discloses the peak current control method in detail.

Because of storage charge in the flyback diodes and the current inertia effect of the filter inductor, a current spike is generated at the leading edge of the power switch's current waveform when the clock turns the power switch on. This current spike is filtered in a low-pass filter before the current level is coupled to the comparator, in the peak current control, comparing its level with the reference level. This filtering is necessary to prevent the peak current control from responding to the amplitude of the spike and immediately turning the power switch off. This filtering arrangement, however, introduces a sensing error in that the current perceived by the comparator differs from the total current flowing through the power switch. During normal operation, this error is very slight, but during short-circuit conditions when the current pulse is very short in duration, this error becomes a significant portion of the total current flowing through the power switch. The current perceived at the comparator is much less than the actual current flowing through the power switch. Hence, during short-circuit current limited conditions, a current tailout effect occurs wherein the actual current output is much greater than its theoretically regulated value.

This current tailout effect or excess current represents a large surge in current that causes large stresses in the power switch and other components of the converter and, in effect, nullifies to a great extent the limiting effect of the current limit control.

A subsidiary problem caused by the current sensing error in addition to the current tailout effect is the necessity to provide a minimum conduction interval for the power switch to allow turn-off loss reduction networks normally included in converter circuits to properly reset. Normally with peak current control, the conduction interval becomes shorter and shorter during a current overload, and this reduction of the ONTIME is aggravated by the effect of the current sensing error, leaving insufficient time for turn-off loss reduction networks to properly reset.

One solution to the above-described problem discussed in U.S. Pat. No. 4,357,572, issued Nov. 2, 1982, to B. E. Anderson et al. and assigned to the same assignee as this application, involves continuously comparing an integrated value of an inductor voltage sensed during a nonconducting interval of a converter power switch, with a peak value of the filter inductor voltage sensed during a conducting interval of the power switch. When the integrated value attains the value of the peak value, an inhibit signal is removed from the clock supplying drive initiation pulses for the power switch. This control technique assures that the power switch in each cycle of operation during an overload has a substantially constant minimum ONTIME and a lengthened OFFTIME interval and, hence, restricts current tailout.

SUMMARY OF THE INVENTION

A power converter circuit which is voltage regulated and current limited by a peak current control circuit significantly reduces the current tailout effect by decreasing the frequency of operation of the converter during low voltage output current limited operation by increasing the nonconduction interval of the power switch while maintaining a fixed conduction interval.

The peak current control circuit periodically initiates current conduction in the power switch in response to a clock pulse and terminates conduction when a peak current level is attained. The peak current control includes circuitry to compare decaying current in the filter circuit during nonconducting intervals with a preset current tailout threshold level. The periodic triggering of the power switch into conduction is inhibited until current has decayed to this threshold level. The current tailout threshold level is selected so that periodic triggering of the power switch into conduction is not affected in the voltage regulation mode.

BRIEF DESCRIPTION OF THE DRAWING

An understanding of the invention may be readily attained by reference to the following specification and the accompanying drawing in which.

DETAILED DESCRIPTION

Figure 1:
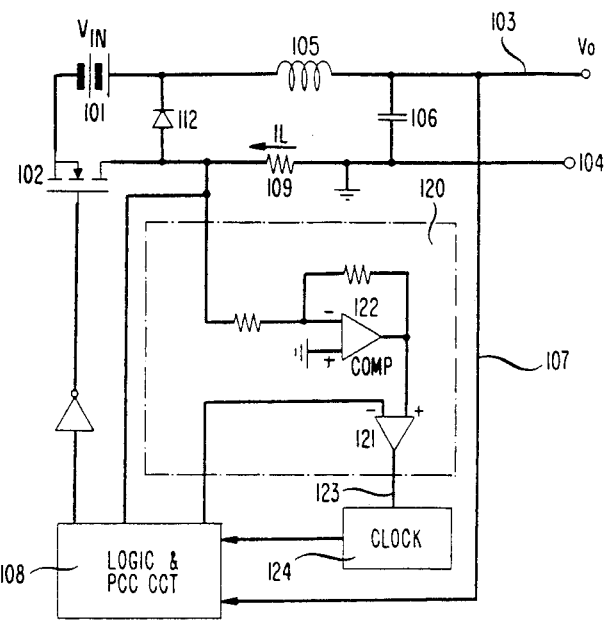
FIG. 1 is a schematic block diagram of a peak current control converter utilizing the principles of the invention.

A single-ended buck-type converter utilizing peak current control to achieve a crossover mode of voltage and current regulation is disclosed in FIG. 1. The DC input voltage supplied by battery 101 is switched by a power switch 102 and coupled, via inductor 105, to output terminals 103 and 104 which may be connected to a load to be energized. The DC output voltage is sensed at the filter capacitor 106 and coupled, via lead 107, to a logic circuit 108 including drive for the power switch 102 and peak current control circuitry. Logic circuit 108 compares the output voltage on lead 107 with a reference voltage and generates an error signal. This error signal is used to set a voltage threshold which represents a current threshold to be compared with a voltage derived from and representing the current flowing through a shunt resistor 109 which represents the power switch current through power switch 102. So, in effect, the power switch current magnitude is compared with an output voltage responsive current threshold in control circuit 108 in order to regulate the output voltage.

Figure 2:
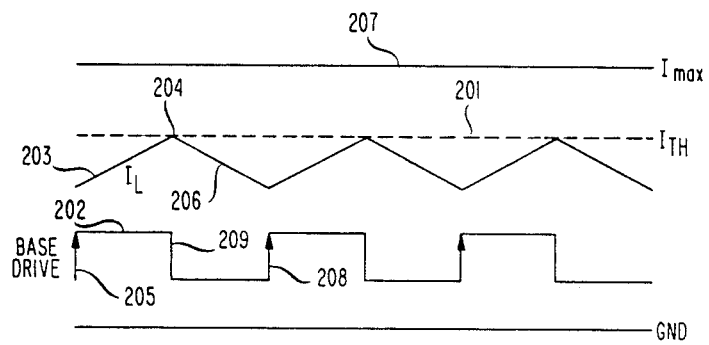
FIGS. 2, 3, 4 and 5 are waveform diagrams to assist in explaining the operation of the converter disclosed in FIG. 1.

The operation of this arrangement may be readily appreciated by reference to the current waveform diagram of FIG. 2 illustrating the voltage regulation technique. In this diagram, the threshold current level line 201 is adjusted up or down in response to the voltage error signal in order to regulate the output voltage. The base drive pulse 202 initiates conduction in the power switch at the leading edge 205 in response to a periodic clock pulse. Current 203 in the power switch starts to flow at this point and increases linearly until its instantaneous value at point 204 equals the current threshold level 201. At this instant, shown by trailing edge 209, the logic circuit terminates the drive pulse; and the power switch 102 is biased nonconducting. Storage inductor current decays linearly as a ramp 206 until occurrence of the next clock pulse at leading edge 208 initiates a new drive pulse to bias the power switch 102 conducting. The maximum threshold current 207 is added to provide current limiting, but is not operative during normal voltage regulation.

Figure 3:
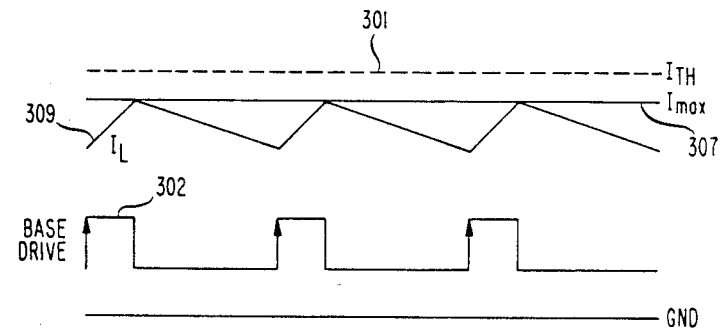

During overload conditions, as shown in FIG. 3, the voltage regulation portion of the logic circuit 108 may increase the voltage regulation current threshold 301 to a high magnitude above the current regulation current threshold 307 in an effort to maintain a regulated output voltage in the face of an overload. The current threshold 307 level is fixed; and, hence, as is apparent, limits the maximum current output of the converter to some predetermined current limit by reducing the ONTIME (increasing current slope 309) or pulse duration of the driving pulse 302. As the overload approaches a short circuit condition, the duration of pulse 302 becomes increasingly shorter.

The current waveform of current flowing through the power switch 102 normally includes a large current spike at the instant of turn on coincident with the leading edge of the drive pulse. The current spike is due to the current inertia characteristic of the filter inductor and to storage charge in the flyback diode 112, which causes both the diode 112 and power switch 102 to conduct simultaneously at the instant the power switch is biased conducting. During normal operation, this current spike, occurring at the leading edge of the ramp current waveform, does little to change the average value of the total current flowing through the power switch each cycle. This current spike, which normally exceeds the preset voltage regulation threshold, does not activate the peak current control to terminate the drive pulse, because a low-pass filter is normally added to the current sensing circuitry to prevent it from causing the current pulse to be prematurely terminated.

However, when an overload, such as a short circuit, occurs, the peak current control attempts to limit the current output of the converter by significantly reducing the current pulse duration. With these current pulses of very short duration, the current spike represents a significant part of the total current flow through the power switch each cycle; and, hence, the filtered waveform used for control purposes is not an accurate representation of the actual current flow therethrough.

Figure 4:
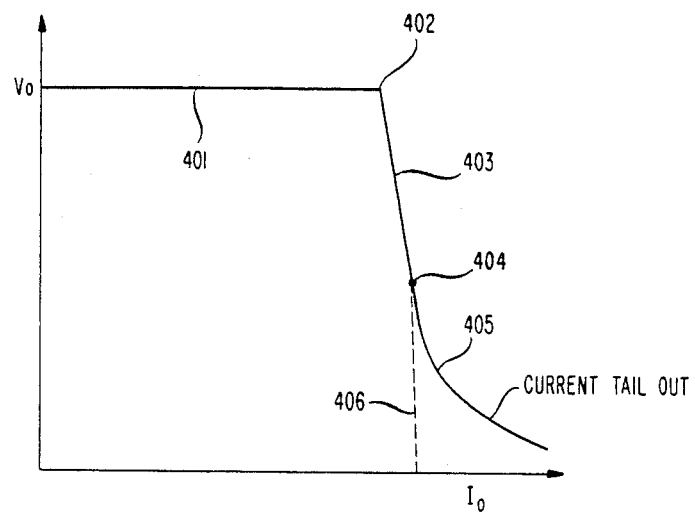

The effect of the current spike during overload conditions may be readily ascertained by reference to FIG. 4, which shows the current voltage output characteristics of a peak current controlled converter, and how it is affected by the initial current spike during overload conditions. As is apparent from the figure, the voltage regulation characteristic represented by line 401 is constant in amplitude up to the current limit break point 402. At this point, the voltage drops significantly while current increases only slightly, as shown by current regulation line 403. Below point 404, however, the subsequent current regulation curve 405 tends to tailout with a large increase of current output due to the current sensing inaccuracy caused by the initial current spike.

Figure 5:
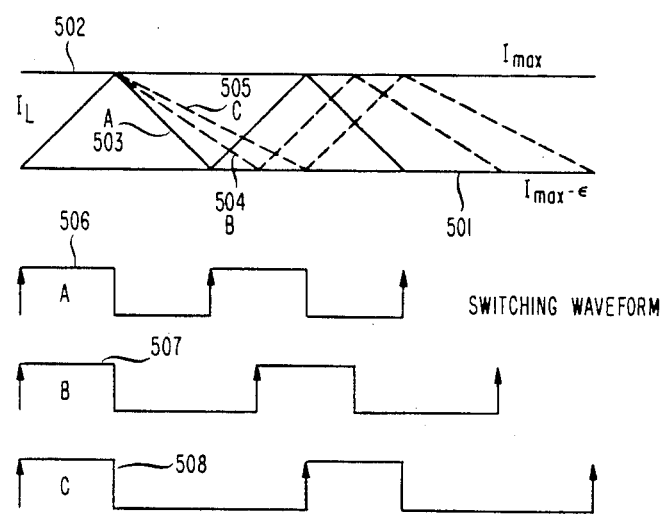

The converter of FIG. 1 includes short circuit control circuitry operative to overcome the current tailout problem, and causes the current regulation characteristics to follow the dotted line 406 of FIG. 4 during an overload. This is accomplished by the introduction of a current tailout threshold 501, as shown in FIG. 5, which is fixed, as was the current limit threshold 502, but which is lesser in magnitude. As is apparent from FIG. 5, the current tailout threshold level 501 is a threshold level for the decaying storage inductor current after the power switch has ceased conduction. After the power switch is biased nonconducting, the clock is inhibited from redriving it into conduction until the decaying current has reached the current tailout threshold 501. As is apparent from the current waveforms 503, 504 and 505, representing varying degrees of overload, the ONTIME (represented by the rising ramp of current) remains constant, while the OFFTIME (represented by the decaying ramp of current) is dependent on the slope of the decaying current. This allows a constant duration pulse drive with increasing intervals between the successive drive pulses, as shown by the nonconducting intervals of the power switch following the drive pulses 506, 507 and 508, respectively.

A particular tailout control is implemented in the converter of FIG. 1 by the addition of a current tailout control 120, which includes a comparator 121 to compare a voltage proportional to the sensed current supplied by op amp 122 with a current tailout threshold value supplied by the logic circuit 108. The output of the comparator 121 applies a signal via lead 123 to prevent the clock 124 from supplying a trigger signal to initiate conduction in the power switch until the current sensed in shunt resistor 109 has decayed to a preset threshold or tailout value operative to prevent the current tailout.

The current tailout control circuit, while normally continuously active, does not interfere with normal operation of this converter if the current tailout limit is selected properly. The driver circuit for the power switch transistor 102 is designed to turn on the transistor in response to a clock pulse and to keep the transistor on until the peak current control logic supplies a turn-off pulse, or the clock has reached the end of a cycle. During normal conduction under voltage regulation control, the current drops below the current tailout limit long before the subsequent clock pulse to turn on the power switch is normally generated. Hence, the current tailout limit has no effect until the regulation circuitry is operating in a current limit mode. The current tailout level is selected so that current regulation operates normally above node 404 in FIG. 4, with current tailout control becoming effective below that point.

Figure 6:
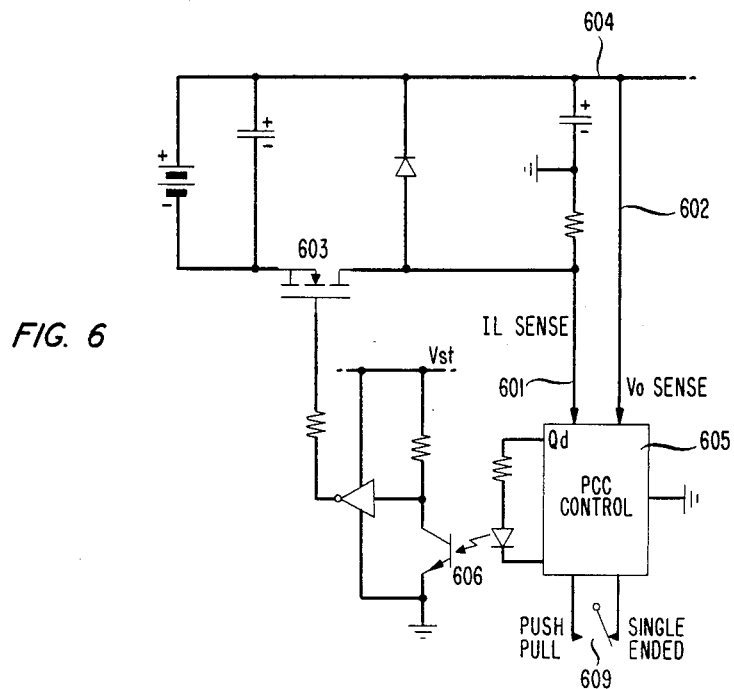
FIG. 6 is a schematic and block diagram of a single-ended converter embodying the principles of the invention.

A single-ended converter utilizing peak current control with short circuit tailout current limit is shown in FIG. 6. Current sense lead 601 and output voltage sense lead 602 are connected to sense the current of power switch 603 and the voltage of output terminal 604, respectively. These sensed signals are applied to the peak current control circuit 605, which is disclosed in detail in FIG. 8. The output of the peak current control 605 is a drive pulse transmitted via an optocoupler 606 to drive the power switching transistor 603. The peak current control 605 includes a switch 609 whose setting allows it to be used to control either a single-ended or push/pull type converter, as described subsequently.

Figure 7:
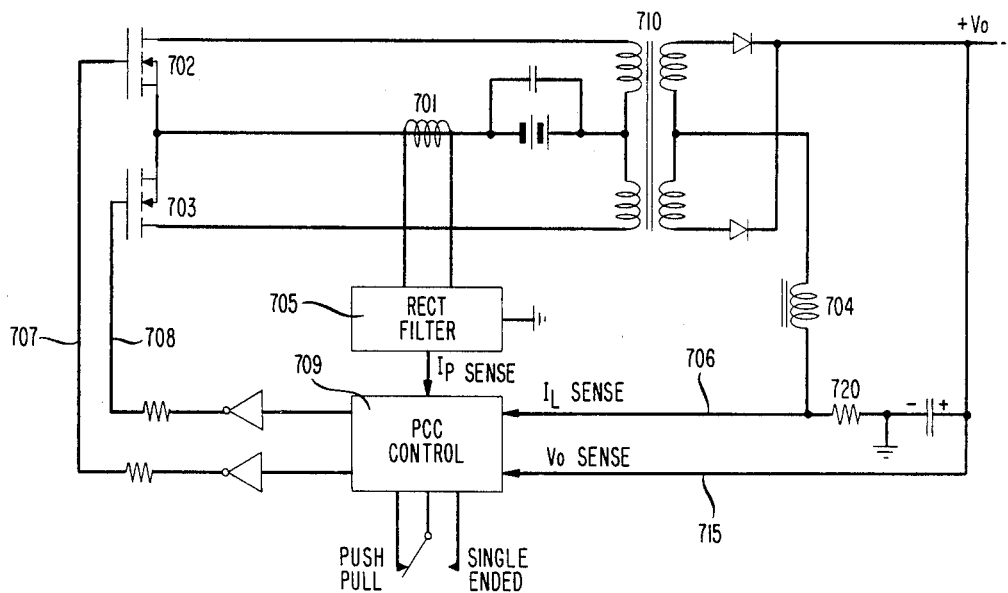
FIG. 7 is a schematic and block diagram of a push/pull converter embodying the principles of the invention.

This same peak current control circuit, designated 709 in FIG. 7, is used to control a push/pull type converter circuit having two power switches 702 and 703. Current in the converter circuit is sensed at two locations. A primary current sensor 701 senses the current alternately flowing in power switches 702 and 703 and, hence, is used to maintain current symmetry between the two power switches. An output current in filter inductor 704 on the secondary side of the converter transformer 710 is sensed by resistor 720. The primary sensed current is coupled, via rectifier and filter circuit 705, to the peak current control circuit 709. The output current is coupled to control circuit 709 via lead 706. A voltage output of the converter is coupled to control circuit 709 via lead 715. The output of the peak current control comprises drive pulses alternately appearing on leads 707 and 708, and operating to control the alternate conductivity states of power switches 702 and 703.

Figure 8:
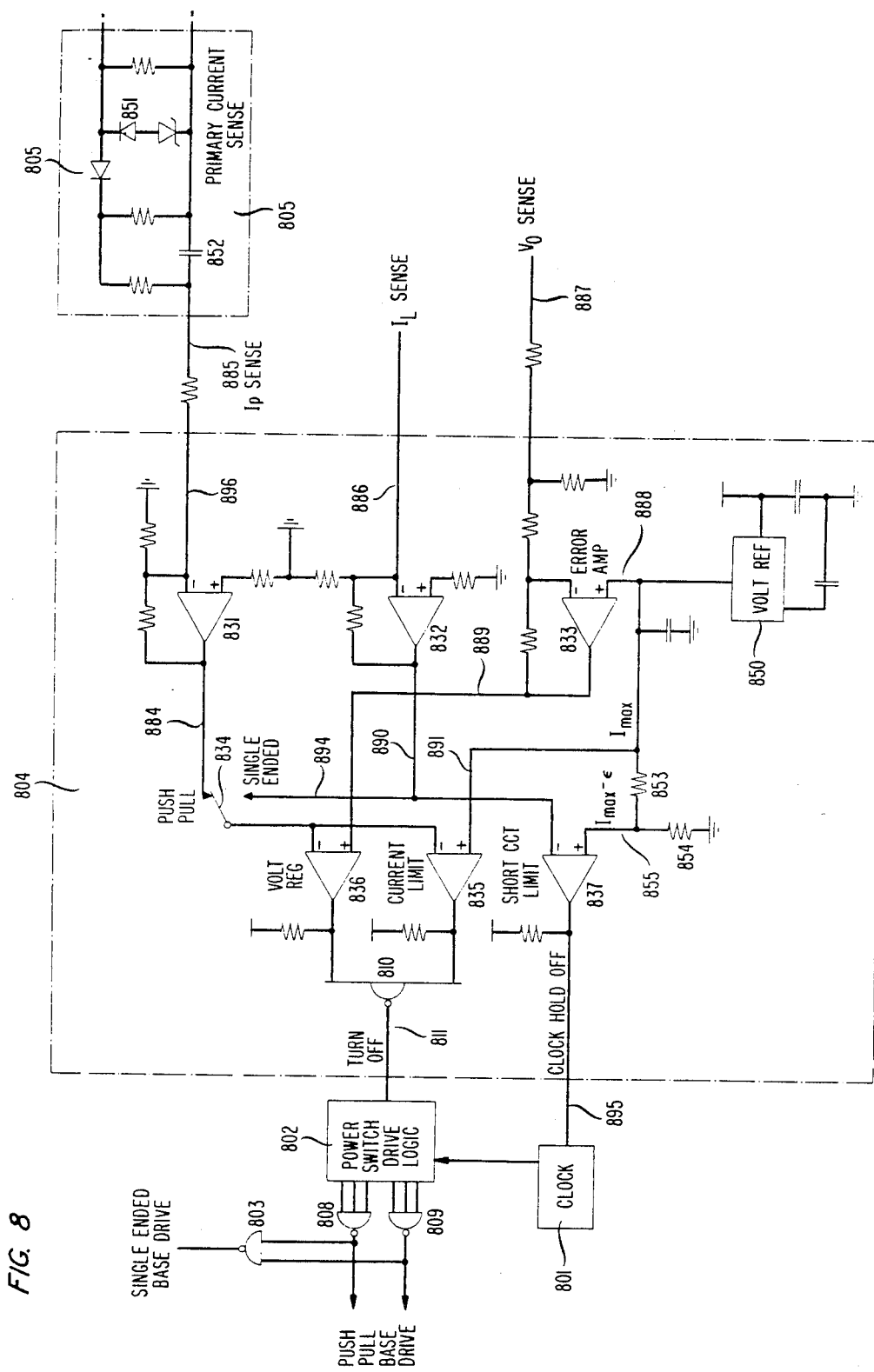
FIG. 8 is a schematic of a peak current control circuit embodying the principles of the invention and utilized in the converter circuits of FIGS. 6 and 7.

A peak current control logic circuit embodying the principles of the invention and suitable for use with either of the converters of FIGS. 6 and 7 is disclosed in FIG. 8. The logic circuit includes a clock circuit 801 operative for initiating the periodic drive signals, a power switch drive circuit 802 to supply drive signals to the power switches, and a control signal logic circuit 804 to control timing of the drive signals. The control signal logic circuit accepts the sensed current signals, and compares this with reference current levels. Its output signals are applied to drive circuit 802 to terminate conduction in the power switches after they have been periodically turned on by the clock 801.

The control signal logic circuit 804 includes three gain amplifier op amps 831, 832, and 833 to amplify sensed signals. As indicated, this control circuit can be used with either the single-ended or double-ended converters. If the control circuit is used with a double-ended push/pull converter, a select switch 834 is connected to the push/pull terminal 884 which connects amplifier 831 to a current limit comparator 835 and to a voltage regulation comparator 836. The current limit sense amplifier 832 is connected to the short circuit limit comparator 837 only. If the control circuit is to be used with the single-ended converter of FIG. 6, the switch 834 is connected to the single-ended terminal 894; and, hence, the output current sense amplifier 832 is connected to two comparator circuits, the current limit comparator 835 and voltage regulator comparator 836. The primary current sense amplifier 831 is disconnected in this single-ended control version. In both connections, the output voltage sense amplifier 833 is connected to the voltage regulation comparator 836.

The primary current sense amplifier 831 is coupled (in the push/pull mode) to receive a signal from the primary current sense circuit 805, which is coupled to the current sense transformer 701, as shown in FIG. 7. The primary current sense circuit 805 includes a flyback diode 851 in a core reset circuit and a filter capacitor 852, and applies a current sense signal via lead 885 to an input at the primary current sense amplifier 831. The inductor or output current of the converter, as sensed at inductor 704 in FIG. 7, is applied to an input 886 of current sense amplifier 832. Lead 887 couples a sensed output voltage of the converter to amplifier 833.

The peak current control circuit of FIG. 8 may be readily understood with a description of its operating principles. Normally, the clock 801 supplies a periodic drive signal to the power switch drive logic circuit 802 to supply a drive signal via gate 803 to bias the power switch conducting. The power switch is turned off in response to a turn-off signal generated by the peak current control logic 804 applied via lead 811 to the drive logic 802.

The turn-off of each conduction interval of the power switch is controlled by the peak current control circuit 804. As applied to a single-ended converter, switch 834 is coupled to terminal 894 which, as described above, disconnects amplifier 831 from the control circuit. The current threshold utilized for voltage regulation is derived from an error voltage output of comparator connected amplifier 833. Amplifier 833 is coupled via lead 887 to sense the output voltage of the converter. This sensed voltage is compared with a reference voltage on lead 888 supplied by the reference voltage source 850. The result of the comparison is an error signal on lead 889, which is applied to the voltage regulation comparator 836 as a current threshold signal. The output current sensed on lead 886 is coupled by amplifier 832 to the voltage regulation comparator 836. As soon as the current signal on lead 890 exceeds the control signal on lead 899, the comparator 836 applies a signal, via gate 810 and lead 811, to control the power switch drive logic 802 to supply a turn-off signal via the drive gate 803 to turn off the regulator's power switch.

The voltage level appearing on lead 890 is also continuously compared with a maximum current control voltage (Imax) appearing on lead 891. During normal voltage regulation, the current limit control signal level is not reached; and, hence, comparator 835 does not provide a turn-off signal to gate 810. However, when a current overload condition is reached, the output of the comparator 835 is transmitted, via gate 810 and drive logic 802, to supply a signal to gate 803 to turn off the power switch.

In order to prevent current tailout at the low end of the current regulation characteristic, the output current must be allowed to decay to some preset current threshold before the power switch can be rebiased into conduction. To achieve that end, a tailout current threshold less in value than the current regulation threshold (Imax-←-) is derived from a voltage divider comprising resistors 853 and 854 connected to reference voltage source 850. This tailout threshold is applied via lead 855 to comparator 837. Comparator 837 compares this threshold with the amplified sensed output current on lead 890, and generates an output signal on lead 895 to supply an inhibit signal to the clock as long as the output current sense level exceeds the (Imax-←-) level and, hence, prevents the occurrence of current tailout.

If the control circuit is coupled to a push/pull converter, switch 834 is coupled to terminal 884, in which case the primary current sensed on lead 885 becomes the controlling current level sensed for voltage regulation. As is apparent from the figure, the voltage regulation comparator 836 compares the amplified sensed primary current on lead 896 with a voltage error signal on lead 889; and when the sensed current exceeds the error voltage on current control signal, the comparator supplies a signal via gate 810 and lead 811 to generate a turn-off signal in the drive logic, which turn-off signal is applied via one of the gates 808 or 809. The drive logic 802 alternately enables one or the other of the gates 808 or 809, so that the two power switches are alternately driven into conduction.

The current limit comparator 835 is operated in response to current sensed on the secondary side of the converter and operates the same as described above for the single-ended converter. The comparator 837 for the current tailout control is also responsive to the secondary current, and its operation is as described above.

What is claimed is:

1. A power converter circuit comprising
input means for accepting a DC voltage,
output means for accepting a load,
a power switch connected to couple the input means to the output means,
means for periodically initiating conduction in the power switch,
means for sensing a current in the power switch,
means for sensing a voltage at the output means,
means for comparing a voltage of said means for sensing a voltage and generating an error voltage,
means for converting a current at said means for sensing a current to a representative voltage,
means for comparing the error voltage with the representative voltage and generating a stop signal when the representative voltage equals the error voltage to achieve voltage regulation,
means for terminating conduction in the power switch in response to the stop signal of the means for comparing,
means for establishing a current regulation voltage,
means for comparing the current regulation voltage with the representative voltage and generating a second stop signal when the current regulation voltage equals the representative voltage to achieve current regulation,
means for establishing a tailout control voltage,
means for comparing the representative voltage with the tailout control voltage and generating a disable signal when the representative voltage is greater than the tailout control voltage, and
means for inhibiting operation of the means for periodically initiating conduction in the power switch in response to the disable signal.

2. A power converter circuit as defined in claim 1 and including a voltage source and a voltage divider comprising first and second resistors energized by the voltage source,
the reference voltage being tapped from an end node of the voltage divider and the tailout control voltage being tapped from a junction node of the first and second resistors.

3. A power converter circuit as defined in claim 2 wherein the means for periodically initiating conduction comprises a clock circuit including an inhibit input responsive to the disable signal.

4. A power converter comprising:
input and output means
a power switching device coupling the input and output means and periodically initiated into conduction in response to a periodic pulse source,
means for sensing a current in the power switching device and generating a representative voltage of a magnitude of the current,
voltage regulation means for generating a first control voltage,
current regulation means for generating a second control voltage,
means for terminating conduction in the power switching device when the representative voltage equals one of the first and second control voltages,
a threshold voltage source and means for inhibiting periodic initiation of conduction of the power switching device while the current regulation means is operative by disabling the periodic pulse source initiating conduction in the power switching device until the representative voltage is less than a voltage of the threshold voltage source, whereby
the power switching device has extended intervals of nonconduction when the second control voltage is less than the threshold voltage.

5. A power converter as defined in claim 4 wherein, the voltage regulation means includes:
means for monitoring a voltage at the output means and comparing it with a reference voltage and generating the first control voltage therefrom.

6. A power converter as defined in claim 5 wherein, the current regulation means includes:
means for monitoring a current at the output means and comparing it with a reference signal and generating the second control voltage therefrom.

* * * * *